United States Patent [19]

Solomon et al.

[11] 3,957,699

[45] May 18, 1976

[54] PROCESS FOR POLYMERIZING ALLYLAMINES EMPLOYING A REDOX INITIATOR CONSISTING OF $FE^{++}$ OR $TI^{+++}$ WITH $H_2O_2$, HYDROXYL AMINE, OR HYDROPEROXIDES TO FORM INSOLUBLE CROSSLINKED POLYMERS

[75] Inventors: David Henry Solomon, Glen Waverley; Colin Douglas McLean, Mulgrave, both of Australia

[73] Assignee: ICI Australia Limited, Melbourne, Australia

[22] Filed: June 4, 1974

[21] Appl. No.: 476,274

[30] Foreign Application Priority Data

June 12, 1973  Australia............................. 3612/73

[52] U.S. Cl..................... 260/2.1 E; 260/79.3 M; 526/90; 526/219; 526/227; 526/232; 526/274; 526/291; 526/311; 526/261; 526/320; 526/328; 526/332
[51] Int. Cl.² ................... C08F 120/52; C08J 5/20; C08F 218/00; C08F 120/70
[58] Field of Search....... 260/89.7 N, 80.76, 86.1 N, 260/80.81, 88.1 P, 80.73, 80.3 N, 79.3 M, 2.1 E, 2.2 R

[56] References Cited
UNITED STATES PATENTS

| | | |
|---|---|---|
| 2,687,382 | 8/1954 | Butler et al.................. 260/89.7 N |
| 2,926,161 | 2/1960 | Butler et al.................... 260/89.7 N |
| 3,288,770 | 11/1966 | Butler................. 260/88.3 |
| 3,515,707 | 6/1970 | Reimschussel et al......... 260/89.7 N |
| 3,639,364 | 2/1972 | Jefferson....................... 260/89.7 N |
| 3,674,728 | 7/1972 | Carbonnel et al............... 260/2.1 E |
| 3,716,481 | 2/1973 | Battaerd.......................... 260/2.1 E |

FOREIGN PATENTS OR APPLICATIONS 907,079   6/1961   United Kingdom

OTHER PUBLICATIONS

Butler et al. (IV) *J. Am. Chem. Soc.* Vol. 74, pp. 2543–2547.

Butler et al. (VIII), *J. Am. Chem. Soc.* Vol. 79, pp. 3128–3131.

*Primary Examiner*—Joseph L. Schofer
*Assistant Examiner*—Herbert J. Lilling
*Attorney, Agent, or Firm*—Cushman, Darby & Cushman

[57] ABSTRACT

A method of polymerising a composition comprising an allyl amine salt of a strong acid said allyl amine containing two or more allyl groups which method comprises reacting said composition in the presence of a free radical initiator which yields only uncharged fragments and at a temperature between −20 and 80°C and at a pH between 0 and 5 in the absence of oxygen.

10 Claims, No Drawings

PROCESS FOR POLYMERIZING ALLYLAMINES EMPLOYING A REDOX INITIATOR CONSISTING OF FE++ OR TI+++ WITH $H_2O_2$, HYDROXYL AMINE, OR HYDROPEROXIDES TO FORM INSOLUBLE CROSSLINKED POLYMERS

This invention relates to a process for the polymerisation of allyl compounds.

It is known that with free radical initiators allylic compounds polymerise with difficulty only to give low molecular weight products (R C Laible, *Chem. Rev.* 58 (5), 807 (1958),). In this reaction polymerisation is inhibited mainly by chain transfer reactions, such as degradative chain transfer. Because of this characteristic, massive amounts of initiator are usually required in allyl polymerisations, the resulting polymers have a low molecular weight and comprise relatively high quantities of terminal initiator residues.

The free radical polymerisation of allyl compounds such as the di- and tri-allyl monomers leads to cyclic structures by intra molecular polymerisation as well as to network formation. The other major mechanism characteristic of allyl polymerisation, namely degradative transfer, is also operative. Consequently cross-linked polymers are obtained which exhibit residual unsaturation as well as measurable quantities of initiator residues (*Encyclopedia of Polymer Science and Technology*, 1st Edition, Volume 1, page 755 and following).

The introduction of amino grops into allylic monomers further decreases the reactivity of the allyl bond in polymerisation reactions. Thus, while for example allyl esters can be polymerised by heating in the presence of air, allylamine, diallylamine and triallylamine do not polymerise under conditions applicable to the allyl esters.

It was, however, found that allylamines can be polymerised under special conditions, e.g. in the gas phase (U.S. Pat. No. 3,062,798) or copolymerised when dialkyl peroxides are used as catalysts in conjunction with selected solvents (U.S. Pat. No. 3,057,833).

U.K. Patent No. 907,079 proposes the production of homopolymers and copolymers of the N-triallylamine salts and N-tetraallyl ammonium salts using massive quantities of initiator; more specifically anion exchange resins can be made by polymerising tetra-allyl ammonium chloride and triallylamine hydrochloride with large amounts of a free radical initiator (British Pat. No. 939,518).

These prior art polymers and processes have certain disadvantages. High doses of initiators are required, e.g. in British Pat. No. 939,518 between 5 and 20 parts per 100 parts of monomer; consequently large amounts of heteroatoms are retained in the polymer, e.g. 1 to 2% by weight of sulphur, chemically bound, most probably as —$SO_3H$ groups. This represents 0.3 to 0.6 meq/g of a residual acid function which is undesired in a base resin. In line with this, prior art polytriallylamine resins so prepared have a neutralisation capacity of less than 5.5 meq/g, well below their theoretical capacity of 7.2 meq/g. Furthermore these prior art polytriallylamines exhibit two other properties, somewhat surprising for a polymer of a trebly unsaturated compound; they have a lower than expected degree of crosslinking and a higher than expected degree of unsaturation. This has been explained, at least in qualitative terms, by Butler; he has shown (*J.A.C.S.*, 77, 1767-9 (1955),) that monomers containing two allyl groups are subject to a cyclic polymerisation which consumes both allyl groups and a predominantly linear polymer results i.e. the diallyl compounds acts as if it were difunctional not tetrafunctional. At least three allyl groups per monomer unit thus are required to attain crosslinking and insolubility. For the latter, triallyl resins, it has furthermore been postulated that a incestuous tendency to interpolymerisation exists (R C Laible, *Enc. of Polymer Science and Technology I*, p.758) which causes a reduction in the number of double bonds available for cross-linking.

For certain processes the presence of even relatively small amounts of anionic groups in the amine resins is detrimental.

From the point of view of use of these polymers in the socalled "Sirotherm" process (Sirotherm is a Trade Mark of ICI Australia for thermally regenerable ion exchange resins) which is described in the publications:

"The Sirotherm Demineralisation Process — an Ion Exchange Process with Thermal Regeneration", part 1. *J. Inst. Engr. Aust.* (1965) 37, 193:

"An Ion Exchange Process with Thermal Regeneration", *Aust. J. Chem.* (1966), 19, 561 (Part II), 589 (Part III), 765 (Part IV) and 791 (Part V);

"Thermally Regenerated Ion Exchange Process — An Aid to Water Management", J. Water Poll. Control Fed (1966), 38, 1782; and Australian Pat. No. 274,029;

it is even more significant that polymers of triallylamines made according to the prior art, e.g. British Pat. No. 939,518, are unsatisfactory. They have low capacities and, more importantly, do not satisfy the criterion for a satisfactory Sirotherm anionic resin, that the titration (pH) curve obtained on neutralisation with a strong acid under standard conditions exhibits a pH plateau, i.e. an almost steady pH value over a major part of the titration curve (Australian Pat. No. 274,029). Weiss (*Australian Journal of Chemistry*, 1968, Vol.21, pp. 2703-2710, "An Ion Exchange Process with Thermal Regeneration", Part VI) has shown that only resins with this characteristic are useful in this thermocycle. While we do not wish to be bound by theory we consider that the presence of the initiator residues, e.g. the residual sulphonic acid groups, may set up ionic grids which inhibit access and ion exchange and thus affect capacity.

Accordingly we provide a method of polymerising a composition comprising an allyl amine salt of a strong acid said allyl amine containing two or more allyl groups which method comprises reacting said composition in the presence of a free radical initiator which yields only uncharged fragments and at a temperature between −20° and 80°C and at a pH between 0 and 5 in the absence of oxygen.

The nature of the free radical generator is not narrowly critical as long as it does not yield charged fragments during the reaction. Preferably the free radical generator is soluble in the reaction mixture and yields only non-polar fragments. Suitable free radical generators known in the art are, for example, $H_2O_2$, acetyl peroxide, bis (1-hydrocyclohexyl peroxide), t.Butyl hydroperoxide, 2,2-azobisisobutyronitrile, 2,5-diperoxybenzoate, and these are representative of various groups of initiators that can be used. Preferably the reaction is carried out at ambient temperature i.e. at a temperature in the range from 10°C to 30°C.

Preferably the free radical initiator is a redox system of a transition metal ion such as for example $Fe^{++}$, $Ti^{+++}$ with hydrogen peroxide, hydroxylamine or an organic hydroperoxide, e.g. tert. butyl hydroperoxide. The molar percentage of free radicals generated by the initiator based on the monomer is preferably in the range from 0.1 to 10% most preferably from 0.5 to 3.

The nature of the allylamine salt is not narrowly critical.

Suitable allylamine salts containing two or more allyl groups are, for example, salts of triallylamine,1,4-bis(N,N-diallylaminomethyl) benzene, 1,3,5-tris-(N,N-diallylaminomethyl) benzene, N-(4-dimethylbenzyl)-diallylamine, N-(4-N,-dimethylaminomethylbenzyl) diallylamine, N-(4-N,N-diallylaminomethylbenzyl) diallylamine, N-(4-N,N-dipropylaminomethylbenzyl)-diallylamine, N-(4-N,N-diisopropylaminomethylbenzyl) diallylamine, alkyldiallylamine and bis (N,N-diallylamino)-alkanes, e.g. 1,6-bis (N,N-diallyl amino)-hexane, with a strong acid such as for example hydrochloric, sulphuric, nitric or phosphoric acids.

The allyl amine salts may be used separately or in admixture. To obtain adequate crosslinking it is necessary to add a crosslinking agent when amines containing only two allyl groups are used. Suitable crosslinking agents are well known in the art and include for example, ethylene glycol dimethacrylate, 1,3-butylene glycol dimethacrylate, divinylbenzene, triallyl cyanurate and the triallyl ether of pentaerythritol.

Preferably the crosslinking agent is a salt of triallylamine or of a bis (diallylamino) alkane wherein the chain contains from 2 to 8 carbon atoms.

The concentration of the amine salt in the reaction is to some extent controlling the amount of crosslinking occurring during the reaction. We have found that a high concentration leads to a higher degree of crosslinking in the product. We prefer that the concentration of monomer in the reaction mixture is greater than 40% w/w and most preferably is in the range from 50 to 70% w/w.

The reaction, is carried out in an inert atmosphere such as nitrogen or argon. The presence of air does not stop the polymerisation, but a reduction in yield and capacity is observed. For use as ion exchange resins the polymers and copolymers of this invention must be produced within controlled particle size ranges. For this purpose precipitation polymerisation and dispersion polymerisation are preferred.

The dispersion polymerisation of an allylamine salt, e.g. the hydrochloride, comprises dispersing a solution of monomer dissolved in a solvent such as water, into a suspension medium, such as petroleum ether or aromatic solvent, this leads to a product consisting of uniform spherical particles of a mean diameter from 0.5 to 50 micron. A stabilizer is normally added.

Solvents suitable for the monomer are for example water, methanol, ethanol, dimethyl formamide, dimethyl sulphoxide and othe aprotic solvents. The size of the beads depends on the concentration of the stabiliser, the monomer solution, the stirring rate and the geometry of the reaction vessel. Beads between 200 mesh and 10 mesh BSS can easily be achieved. The choice of suspension medium is not narrowly critical, provided the medium is not miscible with the monomer solutions. The choice of the stabiliser is not critical; most surfactants used in dispersion polymerisation, e.g. hydrocarbon soluble amines or quaternary ammonium terminated surface active agents as well as cellulose ethers are suitable. Copolymers of similar particle size may be prepared in similar systems in the same manner as that used for the manufacture of the homopolymer.

The polymeric beds formed in our process may be used as the basic component of the composite ion exchange particles described in U.S. Pat. No. 3,645,922. For this use the beads should be between 0.1 to 20 microns more preferably in the range from 1 to 3 microns in diameter. It is a very important feature of our invention that beads in this size range may be produced without difficulty.

This invention is now illustrated by, but by no means limited to the following examples:

EXAMPLE 1

This example demonstrates the polymerisation of triallylamine hydrochloride using hydrogen peroxide and a trace of ferric chloride as the initiator.

A mixture of 6.2 g of a 70% triallylamine hydrochloride solution in water, 0.28 g of a 30% hydrogen peroxide solution and 0.036 g of a 15% ferric chloride solution was sealed in a 25 ml flask under nitrogen and heated at 50°C for 4 hours, by which time the mixture had polymerised to a firm gel.

The gel transferred to a blender and macerated with 1M hydrochloric acid solution. The solid cake obtained by filtration of the slurry was thoroughly washed with 1M hydrochloric acid followed by prolonged washing with 1M sodium hydroxide solution until no more chloride ion could be leached from the resin. The resin was finally rinsed free from sodium hydroxide with water and dried.

The polymer was obtained in 60% yield with an anionic ion exchange capacity of 6.4 meq/g and a swelling ratio of 2.2. The pH titration produced a flat curve with a pH of half neutralisation of 7.9. The change in pH ($\Delta pH$) from 10% neutralisation to 60% neutralisation was 0.3 of a unit.

EXAMPLE 2

This example demonstrates the polymerisation of triallylamine HCl using hydrogen peroxide and titanium trichloride as the initiator.

A mixture of 150 g of triallylamine hydrochloride solution, pH2 (70% in water) and 2.7 ml of 6% aqueous titanium trichloride solution was dispersed as droplets in 1100 ml of petroleum ether (30°–40°C) containing 4.5 g of "Span" 80. (Span 80 is a Trade Mark for sorbitan mono-oleate).

An aqueous solution of 3% hydrogen peroxide (20 ml) was added dropwise to the vigorously stirred dispersion at room temperature. The mixture turned orange at the end of the addition. The product beads were filtered off and washed with 1M HCl until all colour was removed. The yield of polymer hydrochloride was 62 g.

EXAMPLE 3

The procedure described in example 2 was repeated at a number of temperatures. The results are shown in the table below:

| Temperature | Capacity | pH |
|---|---|---|
| 20°C | 7.1 | 0.0 |
| 30°C | 7.1 | 0.1 |
| 40°C | 6.8 | 0.3 |

-continued

| Temperature | Capacity | pH |
|---|---|---|
| 70°C | 6.7 | 0.6 |

EXAMPLE 4

The procedure described in example 2 was repeated at pH −1, 1, 5 and 7. No polymer was obtained at pH −1 and the polymer isolated at pH7 was only lightly crosslinked and had unsuitable mechanical properties. The polymers obtained at pH 1 and 5 had reasonable properties but were inferior to the polymers obtained at pH2.

EXAMPLE 5

The procedure described in example 2 was repeated using different monomer concentrations. The results are shown in the table below.

| Monomer Conc. % w/w | Init. | Init. Conc. % w/w | Yield | Capacity | SR[c] | pH$_{1/2}$[d] | ΔpH[e] |
|---|---|---|---|---|---|---|---|
| 70[b] | '' | 1.7 | 58 | 7.1 | 2.0 | 7.5 | 0.0 |
| 60 | '' | 1.7 | 50 | 6.8 | 1.5 | 7.6 | 0.3 |
| 50 | '' | 1.7 | 60 | 7.0 | 1.4 | 7.4 | 0.6 |
| 40 | '' | 1.7 | 54 | 6.8 | 1.7 | 7.6 | 0.4 |
| 12[a] | '' | 11.0 | 54 | 7.0 | 1.7 | 7.7 | 0.6 |

[a]Solvent — 80% acetone
[b]These are the results from Example 2
[c]Swelling ratio
[d]pH of half neutralisation
[e]change in pH from 10% to 60% neutralisation

EXAMPLE 6

This example demonstrates the polymerisation of triallylamine HCl using hydroxylamine and titanium trichloride.

A mixture of triallylamine HCl (10 g of 70% aqueous solution) and titanium trichloride (1.8 ml of 6% aqueous solution was dispersed in benzene (50 ml) containing Span 80 (0.5 g) and the mixture was degassed with nitrogen.

Hydroxylamine hydrochloride (0.36 g) dissolved in the minimum of water was added slowly to the stirred dispersion. The polymer beads were washed as in Example 1. The beads were obtained in 42% yield and had a swelling ratio of 1.3. The pH at half neutralisation as determined from the pH titration curve was 7.7 and there was no change in the pH from 10% to 60% neutralisation.

The experiment was repeated using t.butyl hydroperoxide in place of hydroxylamine with the following results.

| Monomer Conc. % w/w | Init. | Init. Conc. % w/w | Yield | Capacity | SR | pH$_{1/2}$ | ΔpH |
|---|---|---|---|---|---|---|---|
| 70 | Ti$^{3+}$/tBuOOH | 3.5 | 46 | 7.0 | 2.3 | 7.5 | 0.5 |

EXAMPLE 7

This example demonstrates the polymerisation of triallylamine hydrochloride with ferrous ions and hydrogen peroxide.

A mixture of triallylamine hydrochloride (12.3 g of 70% solution, pH 3), ferrous sulphate (0.1 g) and water (5.7 g) was degassed to remove oxygen, hydrogen peroxide solution (0.2 ml of 30% solution) added and the reaction vessel placed in a batch at 45°C.

After one hour the polymer gel was removed and treated as in example 1.

The polymer was obtained in 43% yield with a swelling ratio of 2.2, and a capacity of 6.7 meq per gram. The pH at half neutralisation was 7.8 and the change in pH from 10% to 60% neutralisation was 0.3 of a unit.

EXAMPLE 8

This example demonstrates the polymerisation of triallylamine hydrochloride using a combination of titanous chloride/hydrogen peroxide and azodiisobutyronitrile initiators in petroleum spirit.

A 70% solution of triallylamine hydrochloride (7 g) containing 0.35 ml of 6% titanous chloride solution (1% by weight of monomer) was dispersed in 50 ml of petroleum spirit (80°–100°C, aromatic free) containing 0.2 g of Span 80.

Nitrogen was blown through the dispersion and 0.6 ml of a 3% solution of hydrogen peroxide was added slowly with vigorous stirring. Beads of polymer were formed after 5 minutes.

Water was removed from the system by heating the reaction mixture under reflux using a Dean and Stark head. Azodiisobutyronitrile (0.15 g) was dissolved in the petroleum spirit and the dispersion was heated at 80°C for 16 hours.

The polymer was collected by filtration and washed as in Example 1. This procedure produced a polymer in 61% yield with a swelling ratio of 1.1 and an anionic ion exchange capacity of 6.1. The pH at half equivalent point, as determined from the pH titration curve, was 7.3 and the change in pH from 10% neutralisation to 60% neutralisation was 0.3 of a pH unit.

EXAMPLE 9

This example illustrates the copolymerisation of bis (N,N diallylamino)-1,6-hexane and methyl diallylamine.

A mixture of 4 g of a 50% aqueous solution of bis (N,N diallylamino)-1,6-hexane, 1 g of a 50% aqueous solution of methyl diallylamine and 0.7 g of a 6% aqueous solution of titanium trichloride were dispersed in 25 ml of benzene and 0.25 g of ethyl cellulose.

A 30% aqueous solution of hydrogen peroxide (0.16 g) was added with stirring at room temperature and the reaction mixture was stirred for two hours. The beads (1.3 g) were recovered as described in Example 1.

The swelling ratio (SR) is 1.1, anionic ion exchange capacity of 6.5 meq/g and the bead size 50–200 microns. The pH at half neutralisation, (ΔpH$_{1/2}$) as determined from the titration curve was 7.2, and the change in pH (ΔpH) from 10% to 60% neutralisation was 0.3 of a unit.

The experiment was repeated using the different diallyl compounds below and the proportion of bis(N,N-diallylamino)-6-hexane shown below.

| Diallyl cpd. | bis-diallyl-cpd conc. % w/w | Init. Conc. % w/w | Yield | Capacity | SR | $pH_{1/2}$ | $\Delta pH$ |
| --- | --- | --- | --- | --- | --- | --- | --- |
| DAA | 10% | 6% | 53% | 8.4 | 2.1 | 9.3 | 0.8 |
| DAA | 20 | 6 | 42 | 7.4 | — | 8.4 | 1.3 |
| MeDAA | 10 | 6 | 56 | 8.4 | 3.0 | 8.8 | 0.4 |
| EtDAA | 10 | 6 | 50 | 7.8 | 3.1 | 8.9 | 0.3 |
| EtDAA | 20 | 6 | 48 | 7.1 | — | 8.7 | 0.4 |
| PrDAA | 10 | 6 | 52 | 6.7 | 2.7 | 8.3 | 0.0 |
| BuDAA | 20 | 6 | 55 | 5.5 | 2.5 | 8.0 | 0.1 |

| | |
| --- | --- |
| DAA | Diallylamine |
| MeDAA | N-Methyldiallylamine |
| EtDAA | N-Ethyldiallylamine |
| PrDAA | N-(n-Propyl)diallylamine |
| BuDAA | N-(n-Butyl)diallylamine |

EXAMPLE 10

This example demonstrates the polymerisation of bis-diallyamino-1,6 hexane using titanium trichloride and hydrogen peroxide in a stirred system.

A mixture of 10 g of a 50% solution of bis-diallylamino-1,6-hexane hydrochloride and 1.7 g of a 6% solution of titanium trichloride was dispersed in 50 ml of benzene containing 0.5 g of N-100 ethyl cellulose. The container was purged with nitrogen and 0.18 g of a 30% solution was added slowly while the dispersion was vigorously stirred.

After 4 hours the polymer was isolated by filtration and washed thoroughly as in Example 1.

The polymer was obtained in 75% yield with a swelling ratio of 1.1 and an anionic ion exchange capacity of 5.9 meq/g. The pH at half neutralisation, as determined from the pH titration curve, was 7.2. There was zero change in pH from 10% neutralisation to 60% neutralisation.

EXAMPLE 11

This example demonstrates the copolymerisation of bis-diallylamine-1,6-hexane hydrochloride and N-methyldiallylamine hydrochloride using titanium trichloride and hydrogen peroxide as the initiator in a stirred system.

A mixture of 2.5 g of a 50% bis-diallylamine-1,6-hexane hydrochloride solution, 2.5 g of a 50% N-methyldiallylamine hydrochloride and 0.7 g of a 6% titanium trichloride solution was dispersed in 25 ml of benzene containing 0.25 g of N-100 ethyl cellulose. After flushing the system with $N_2$, 0.1 g of a 30% solution of hydrogen peroxide was added and the reaction mixture stirred for two hours after which time the polymer was collected by filtration and washed as in Example 1.

The polymer was obtained in 55% yield, with a swelling ratio of 1.5 and an anionic ion exchange capacity of 7.75 meq/g. The pH at half equivalent point, as determined from the pH titration curve, was 7.6 and the change in pH from 10% neutralisation to 60% neutralisation was 0.6 of a pH unit.

EXAMPLE 12

This example illustrates an optional post treatment of the polymer to increase crosslinking.

A portion of the polytriallylamine hydrochloride resin prepared in Example 2 was added to a solution of divinyl benzene (0.25 g) and azodiisobutyronitrile (0.01 g) dissolved in acetone (5ml). The swollen triallylamine beads were heated at 60°C for 16 hours. The beads after washing with 1 M HCl were found to have a swelling ratio of 1.0 compared to 2.0 for the untreated beads.

EXAMPLE 13

This example demonstrates the polymerisation of bis-diallylamino-1,6-hexane using azobis-isobutyramidinium hydrochloride as the initiator.

Azo-bis-isobutyramidinium hydrochloride (0.10 g) was dissolved in 10 g of a 50% solution of bis-diallylamino-1, 6-hexane hydrochloride. The solution was sealed in a test tube under nitrogen and heated at 60°C for 16 hours. The polymerised material was treated as in Example 1.

The polymer was obtained in 83% yield with a swelling ratio of 1.0 and an anionic ion exchange capacity of 5.6 meq/g. The pH at half equivalent point, as determined from the pH titration curve, was 7.5 and the change in pH from 10% to 60% neutralisation was 0.1 of a pH unit.

EXAMPLE 14

This example demonstrates the copolymerisation of bis-diallylamino-1,6-hexane and N-methyldiallylamine using azo-bis-isobutyramidinium hydrochloride as the initiator.

A mixture of 5 g of a 50% solution of bis-diallylamine-1,6-hexane hydrochloride and 5 g of a 50% solution of N-methyldiallylamine hydrochloride was placed in a vessel with 0.1 g of azo-bis-isobutyramidinium hydrochloride. The solution was degassed and heated at 60°C for 16 hours. The polymerised material was treated as in Example 1.

The copolymer was obtained in 65% yield with a swelling ratio of 1.1 and an anionic ion exchange capacity of 6.2 meq/g. The pH at half equivalent point, as determined from the pH titration curve, was 7.5 and the change in pH from 10% neutralisation to 60% neutralisation was 0.0 of a pH unit.

EXAMPLE 15

This example demonstrates the copolymerisation of triallylamine hydrochloride and bis-diallylamino-1,6-hexane hydrochloride using azo-bis-isobutyramidium hydrochloride as the initiator.

A mixture of 10 gm of a 70% triallylamine hydrochloride solution, 3.48 gm of a 20% solution of bis-diallylamino-1,6-hexane hydroxchloride and 0.40 gm of azo-bis-isobutyramidinium chloride was placed in a test tube degassed and heaed at 60°C for 16 hours.

After washing (as in Example 1) the polymer was obtained in 59% yield with a swelling ratio of 1.3 and an anionic ion exchange capacity of 7.3 meq/g. The titration curve showed a flat plateau with pH at half equivalence of 7.7. The change in pH from 10% neutralisation to 60% neutralisation was 0.25 of a unit.

EXAMPLE 16

This example not of our invention demonstrates the polymerisation of triallylamine hydrochloride using ammonium persulphate and sodium metabisulphite as the initiator in a stirred solution and shows the deleterious effect of charged fragments of initiator.

"N 100" ethyl cellulose (0.5 g) was dissolved in benzene (50 ml) and placed in a 250 ml flanged flask fitted with a lid, anchor stirrer, $N_2$ inlet tube and tap. N 100 ethyl cellulose is a Trade Mark for ethyl cellulose.

Sodium metabisulphite (0.42 g) was dissolved in 15 ml of 70% triallylamine hydrochloride solution and added to the reaction vessel. The mixture was stirred vigorously under $N_2$ and a saturated solution of 0.6 g of ammonium persulphate in water was added in one portion. Stirring was continued for 24 hours after which time the fine white polymer particles were filtered and washed as in Example 1.

The polymer was obtained in 78% yield with an anionic exchange capacity of 5.8 meq/g and a swelling ratio of 1.3. The titration curve showed a flat plateau with a pH at half neutralisation 7.3. The change in pH from 10% neutralisation to 60% neutralisation was 0.1 of a unit.

EXAMPLE 17

This example demonstrates the polymerisation, in bulk, of triallylamine hydrochloride using azo-bis-isobutyramidinium hydrochloride as the initiator.

Azo-bis-isobutyramidinium hydrochloride (0.35 g) was dissolved in 10 g of a 70% solution of triallylamine hydrochloride. The resulting solution was sealed in a test tube under nitrogen and heated at 60°C for 16 hours. The polymerised material was treated as in Example 1.

The polymer was obtained in 70% yield with an anionic ion exchange capacity at 6.6 meq/g and a swelling ratio of 1.4. The titration curve showed a flat plateau with pH at half neutralisation of 7.5. The change in pH from 10% neutralisation to 60% neutralisation was 0.1 of a unit.

The experiment was repeated using the monomer concentration and initiator concentration shown below. The yields and properties of the product are also shown below.

| Monomer Conc. % w/w | Init. Conc. % w/w | Yield | Capacity | SR | $pH_{1/2}$ | $\Delta pH$ |
|---|---|---|---|---|---|---|
| 70 | 4.5 | 69 | 6.3 | 1.6 | 7.6 | 0.2 |
| 60 | 3.2 | 68 | 6.3 | 1.5 | 7.4 | 0.5 |
| 60 | 4.5 | 77 | 6.4 | 1.4 | 7.4 | 0.6 |
| 50 | 3.2 | 72 | 6.3 | 2.0 | 7.7 | 0.8 |
| 50 | 4.5 | 77 | 6.6 | 1.6 | 7.7 | 0.8 |
| 30 | 3.2 | 68 | 7.0 | 2.0 | 8.0 | 1.0 |
| 30 | 4.5 | 72 | 7.6 | 2.0 | 8.1 | 1.2 |
| 15 | 3.2 | Linear Polymer | | | | |

EXAMPLE 18

This example illustrates the polymerisation and bis(-diallylamino) alkane dihydrochloride of general formula $(Allyl)_2N(CH_2)_nN(Allyl)_2$ with titanium trichloride and hydrogen peroxide using petroleum spirit as the dispersing agent.

The following general procedure was carried out: A mixture of 1,10-bis(diallylamino)alkane dihydrochloride solution (10 g of 50% aqueous solution of pH 1.0) and titanium trichloride solution (1.1 g of 14% aqueous solution) was dispersed in petroleum spirit (75 ml) containing Span 80 (0.3 g) and the dispersion was purged with nitrogen.

A 3% aqueous solution of hydrogen peroxide was added slowly with vigorous stirring until the dispersion turned bright orange. The product was isolated by filtration and washed as in the previous examples. The results are shown below:

| Polymer | Yield % | Capacity | $pH_{1/2}$ | $\Delta pH$ | W.R.[b] |
|---|---|---|---|---|---|
| n=2[a] | 64 | — | c | — | 1.39 |
| n=3 | 65 | 7.75 | 7.55 | 1.00 | 1.45 |
| n=4 | 63 | 7.13 | 7.90 | 0.60 | 1.61 |
| n=5 | 63 | 6.15 | 7.85 | 0.30 | 1.75 |
| n=6 | 64 | 6.13 | 7.65 | 0.30 | 1.86 |
| n=7 | 62 | 5.44 | 7.21 | 0.20 | 2.00 |
| n=8 | 61 | 5.42 | 6.90 | 0.15 | 2.17 |
| n=9 | 67 | 4.99 | 6.70 | 0.20 | 2.20 |
| n=10 | 58 | 4.32 | 6.58 | 0.25 | 2.44 |

[a] n is the number $CH_2$ units in the alkylene group
[b] water regain
[c] the sloping curve obtained from this polymer made it impossible to measure accurately the capacity $pH_{1/2}$ and $\Delta pH$

We claim:

1. A method of manufacturing a water insoluble cross-linked weakly basic ion exchange polymer comprising polymerizing in the presence of a free radical initiator which is soluble in the reaction mixture, which yields only uncharged non-polar fragments and which is a redox system of a transition metal selected from the group consisting of $Fe^{++}$ and $Ti^{+++}$ with hydrogen peroxide, hydroxyl amine or an organic hydroperoxide, and at a temperature between —20° and 80°C and at a pH between 0 and 5, in the absence of oxygen, (1) an allylamine salt of a strong acid, said allylamine containing three allyl groups, (2) an allylamine salt of a strong acid, said allylamine containing two allyl groups with a cross-linking agent chosen from the group consisting essentially of strong acid salts of a triallyl amine, strong acid salts of bis (diallylamino) alkane, ethylene glycol dimethacrylate, 1,3-butylene glycol dimethacrylate, divinyl benzene, triallyl cyanurate and the triallyl ether of pentaerythritol, or (3) an allylamine salt of a strong acid, said allylamine containing three allyl groups with a cross-linking agent of the group consisting essentially of strong acid salts of bis (diallylamino) alkane, ethylene glycol dimethacrylate, 1,3-butylene glycol dimethacrylate, divinyl benzene, triallyl cyanurate and the triallyl ether of pentaerythritol.

2. A method according to claim 1 wherein the free radical generator is chosen from the group consisting of $H_2O_2$, acetyl peroxide, bis (1-hydrocyclohexyl peroxide), t.butyl hydroperoxide, 2,2-azobisisobutyronitrle, 2,5-diperoxybenzoate.

3. A method according to claim 1 wherein the temperature is between 10° to 30°C.

4. A method according to claim 1 inclusive wherein the molar percentage of free radicals generated by the initiator based on the allyl amine salt is in the range from 0.1 to 10.

5. A method according to claim 4 wherein the molar percentage of free radicals is from 0.5 to 3.

6. A method according to claim 1 inclusive wherein the allylamine salt is chosen from the group consisting of salts of triallylamine, 1,4-bis(N,N-diallylaminomethyl) benzene, N-(4-N,N-dimethylaminobenzyl)-diallylamine, N-(4-N,N-dimethylaminomethylbenzyl)-diallylamine, N-(4-N,N-diallylaminomethylbenzyl)-diallylamine, N-(4-N,N-dipropylaminomethylbenzyl)-diallylamine, N-(4-N,N-diisopropylaminomethylbenzyl)-diallylamine, alkyldiallylamine, bis (N,N-diallylamino)-alkane, 1,6-bis (N,N-diallyl amino)-hexane, with hydrochloric, sulphuric, nitric and phosphoric acids and mixtures thereof.

7. A method according to claim 1 wherein the concentration of allylamine salt in the reaction mixture is greater than 40% w/w.

8. A method accoording to claim 7 wherein the concentration is in the range from 50 to 70% w/w.

9. A method of dispersion polymerisation according to claim 1 inclusive wherein the allylamine salt is dissolved in a solvent and dispersed into a suspension medium.

10. A method according to claim 9 wherein the allylamine salt is dissolved in a solvent chosen from the group consisting of water methanol, ethanol, dimethylformamide, dimethylsulphoxide, and the suspension medium is petroleum ether or an aromatic solvent and the reaction is carried out in the presence of a stabilizer.

* * * * *